(12) United States Patent
Kameya et al.

(10) Patent No.: US 7,664,619 B2
(45) Date of Patent: Feb. 16, 2010

(54) FAULT DETECTION UNIT FOR ROTATION ANGLE DETECTING DEVICE

(75) Inventors: Hisashi Kameya, Kariya (JP); Kenichiro Hidaka, Aichi-ken (JP)

(73) Assignee: Denso Corporation, Kariya (JP)

(*) Notice: Subject to any disclaimer, the term of this patent is extended or adjusted under 35 U.S.C. 154(b) by 466 days.

(21) Appl. No.: 11/806,736

(22) Filed: Jun. 4, 2007

(65) Prior Publication Data
US 2008/0052562 A1 Feb. 28, 2008

(30) Foreign Application Priority Data
Aug. 22, 2006 (JP) ............................. 2006-225795

(51) Int. Cl.
*G06F 11/30* (2006.01)
(52) U.S. Cl. ..................................... 702/183
(58) Field of Classification Search ................ 702/183, 702/56; 73/862.326, 862.23; 318/400.21, 318/806; 324/207.18; 388/800; 714/47
See application file for complete search history.

(56) References Cited

U.S. PATENT DOCUMENTS

| | | | |
|---|---|---|---|
| 4,612,503 A * | 9/1986 | Shimizu et al. | 324/207.18 |
| 5,488,281 A * | 1/1996 | Unsworth et al. | 318/806 |
| 7,154,404 B2 * | 12/2006 | Sato | 318/400.21 |
| 2002/0172509 A1 * | 11/2002 | Kameya et al. | 388/800 |
| 2004/0154410 A1 * | 8/2004 | Kondo et al. | 73/862.23 |
| 2006/0265154 A1 * | 11/2006 | Potts | 702/56 |
| 2006/0288800 A1 * | 12/2006 | Mukai et al. | 73/862.326 |

FOREIGN PATENT DOCUMENTS

| JP | 09-072758 | | 3/1997 |
|---|---|---|---|
| JP | 11037797 A | * | 2/1999 |
| JP | 2006-177750 | | 7/2006 |

OTHER PUBLICATIONS

Chinese Office Action dated Nov. 14, 2008, issued in counterpart Chinese Application No. 200710142395.9, with English translation.

* cited by examiner

*Primary Examiner*—Tung S Lau
*Assistant Examiner*—Xiuquin Sun
(74) *Attorney, Agent, or Firm*—Nixon & Vanderhye P.C.

(57) ABSTRACT

A fault detection unit detects a fault occurred in a detecting device which detects a rotational angle of a rotor with respect to a stator from sine and cosine wave signals having amplitudes modulated in a sinusoidal wave shape in a cycle of rotation of the rotor. The unit produces a judging value from the signals, judges occurrence of a fault from the value placed out of a normal range, and judges the device to be in a tentative fault state when the judgment is continued. After this judgment, when the rotational angle is changed over its entire range while the value is placed within the normal range, the unit judges the device to have returned to a normal state. In contrast, when the judgment is still continued, the unit judges the device to be in a determinate fault state and decides the occurrence of the fault.

5 Claims, 7 Drawing Sheets

FAULT DETECTION UNIT FOR ROTATION ANGLE DETECTING DEVICE

CROSS-REFERENCE TO RELATED APPLICATION

This application is based upon and claims the benefit of priority of the prior Japanese Patent Application 2006-225795 filed on Aug. 22, 2006 so that the contents of which are incorporated herein by reference.

BACKGROUND OF THE INVENTION

1. Field of the Invention

The present invention generally relates to a fault detection unit which is used for a rotation angle detecting device for detecting a rotation angle of a rotor with respect to a stator and detects the occurrence of a fault in the device.

2. Description of Related Art

As well known, a rotational angle detecting device is used to detect a rotation angle of a rotor with respect to a stator by using a resolver. In this device, an exciting signal having a predetermined periodic waveform is supplied to a resolver, a sine-wave phase signal and a cosine-wave phase signal are output from the resolver in response to the exciting signal, and each of the phase signals is amplitude-modulated in a sinusoidal shape to extract a sine-wave phase amplitude signal $As(\theta)$ and a cosine-wave phase amplitude signal $Ac(\theta)$ from the phase signals, respectively. Each amplitude signal has an amplitude changed with the rotational angle, and a rotational angle $\theta$ of a rotor with respect to a stator is calculated from the amplitude signals.

Further, a unit for detecting a fault of the resolver used in the rotational angle detecting device is known. For example, Published Japanese Patent First Publication No. H09-72758 has disclosed a resolver fault detection unit. In this unit, a square of amplitude is calculated for each amplitude signal. When it is detected that a sum $As(\theta)^2 + As(\theta)^2$ of the squared amplitudes or a square root of the sum is out of a predetermined range, it is judged that a fault has occurred in the resolver.

However, in this unit, even if a fault has actually occurred in the resolver, there is a case where the sum or the square root is within the range. Therefore, in this case, it is erroneously judged that no fault has occurred in the resolver. In contrast, even if no fault has actually occurred in the resolver, there is a case where, although the unit can detect the rotational angle $\theta$, the unit cannot temporarily detect the amplitude signals correctly. Therefore, in this case, it is erroneously judged that a fault has occurred in the resolver.

To solve this problem, Published Japanese Patent First Publication No. 2006-177750 has disclosed another resolver fault detection unit for a rotational angle detecting device. In this Publication, the unit calculates the rotational angle $\theta$ and a square root of a sum $As(\theta)^2 + As(\theta)^2$ squared amplitudes from the amplitude signals $As(\theta)$ and $As(\theta)$. When the unit detects that the square root is out of a predetermined range, the unit judges that the resolver is in a tentative fault state. That is, the unit tentatively judges that a fault has occurred in the resolver. When the detection of the square root placed out of the range is continued for a predetermined period of time, the unit judges that the resolver is in a finally-determined fault state. That is, the unit finally judges that a fault has occurred in the resolver. In contrast, when the unit detects that the rotational angle $\theta$ repeatedly calculated after the judgment to be in the tentative fault state is changed over the entire range from 0 to $2\pi$ radians, the tentative judgment is annulled, and the unit judges that the resolver returns to a normal state. That is, the unit judges that no fault has occurred in the resolver. Accordingly, because the tentative fault state is considered in a state transfer from the normal state to the finally-determined fault state, there is little possibility that a fault of the resolver is erroneously judged.

Assuming that a condition type for returning to the normal state from the tentative fault state is set to be the same as a condition type for judging the resolver to be in the tentative fault state, the unit disclosed in the Publication No. 2006-177750 has the same problem as that in the unit disclosed in the Publication No. H09-72758. That is, assuming that the square root placed within the predetermined range is set as a returning condition, the judgment to be in the normal state and the judgment to be in the tentative fault state are alternatively made in the unit. However, in the unit disclosed in the Publication No. 2006-177750, the rotational angle $\theta$ changed over the entire range from 0 to $2\pi$ radians in the tentative fault state is set as a returning condition. Therefore, the returning condition type differs from the condition type for judging the resolver to be in the tentative fault state. Accordingly, the repeatedly-alternated judgment between the normal state and the tentative fault state can be prevented.

However, in the unit disclosed in the Publication No. 2006-177750, even if a fault has actually occurred in the resolver, there is a case where the unit erroneously judges that the resolver judged to be in the tentative fault state returns to the normal state. When the unit erroneously judges the resolver actually set in a fault state to be in the normal state, a control such as a motor control using a detection result of the rotational angle detecting device is erroneously operated.

SUMMARY OF THE INVENTION

An object of the present invention is to provide, with due consideration to the drawbacks of the conventional resolver fault detection unit, a fault detection unit which correctly detects the occurrence of a fault in a rotational angle detecting device by appropriately judging the detecting device to have returned from a tentative fault state to a normal state.

According to an aspect of this invention, the object is achieved by the provision of a fault detection unit for detecting a fault occurred in a detecting device which detects a rotational angle of a rotor with respect to a stator from a sine-wave phase signal and a cosine-wave phase signal of which amplitudes are modulated in a sinusoidal wave shape so as to be changed in a cycle of the rotation of the rotor. The fault detection unit has first to fifth sections. The first section produces a fault judging value determined from the sine-wave phase signal and/or the cosine-wave phase signal received from the detecting device. The second section judges based on the fault judging value placed out of a normal range that a fault has occurred in the detecting device. The third section judges the detecting device to be in a tentative fault state, in response to continuation of the judgment by the second section for a first predetermined period of time. The fourth section examines whether the rotational angle is changed over its entire range and judges the detecting device, judged by the third section to be in the tentative fault state, to have returned to a normal state, in response to the rotational angle changed over the entire range and the fault judging value always placed within the normal range during the change of the rotational angle over the entire range. The fifth section judges the detecting device to be in a determinate fault state in response to continuation of the judgment by the second section for a second predetermined period of time which is longer than the first predetermined period of time, and decides occurrence of a fault in the detecting device.

With this configuration of the fault detection unit, the fourth section makes two conditions for judging the detecting device to have returned to a normal state. The first condition is that the rotational angle is changed over the entire range, and the second condition is that the fault judging value is placed within the normal range. When these conditions are simultaneously satisfied, the fourth section judges the detecting device to have returned to a normal state.

Therefore, when a fault has actually occurred in the detecting device, there is little probability that the fault detection unit erroneously judges the detecting device to have returned to a normal state. Accordingly, the fault detection unit can appropriately judge an actual state of the detecting device.

Further, the judging condition in the third section is that the judgment of the occurrence of a fault base on the fault judging value placed out of a normal range is continued by the second section for a first predetermined period of time. Therefore, the judging condition in the fourth section includes the rotational angle changed over the entire range which differs from the judging condition in the third section. Accordingly, there is little probability that the judgment of the third section and the judgment of the fourth section are alternately made.

Moreover, when the two conditions are simultaneously satisfied in the fourth section, the detecting device judged by the third section to be in the tentative fault state is judged to have returned to a normal state. Accordingly, there is little probability that the fault detection unit unnecessarily detects a fault of the detecting device.

DETAILED DESCRIPTION OF THE PREFERRED EMBODIMENTS

An embodiment and its modifications of the present invention will now be described with reference to the accompanying drawings.

Embodiment

Figure 1:
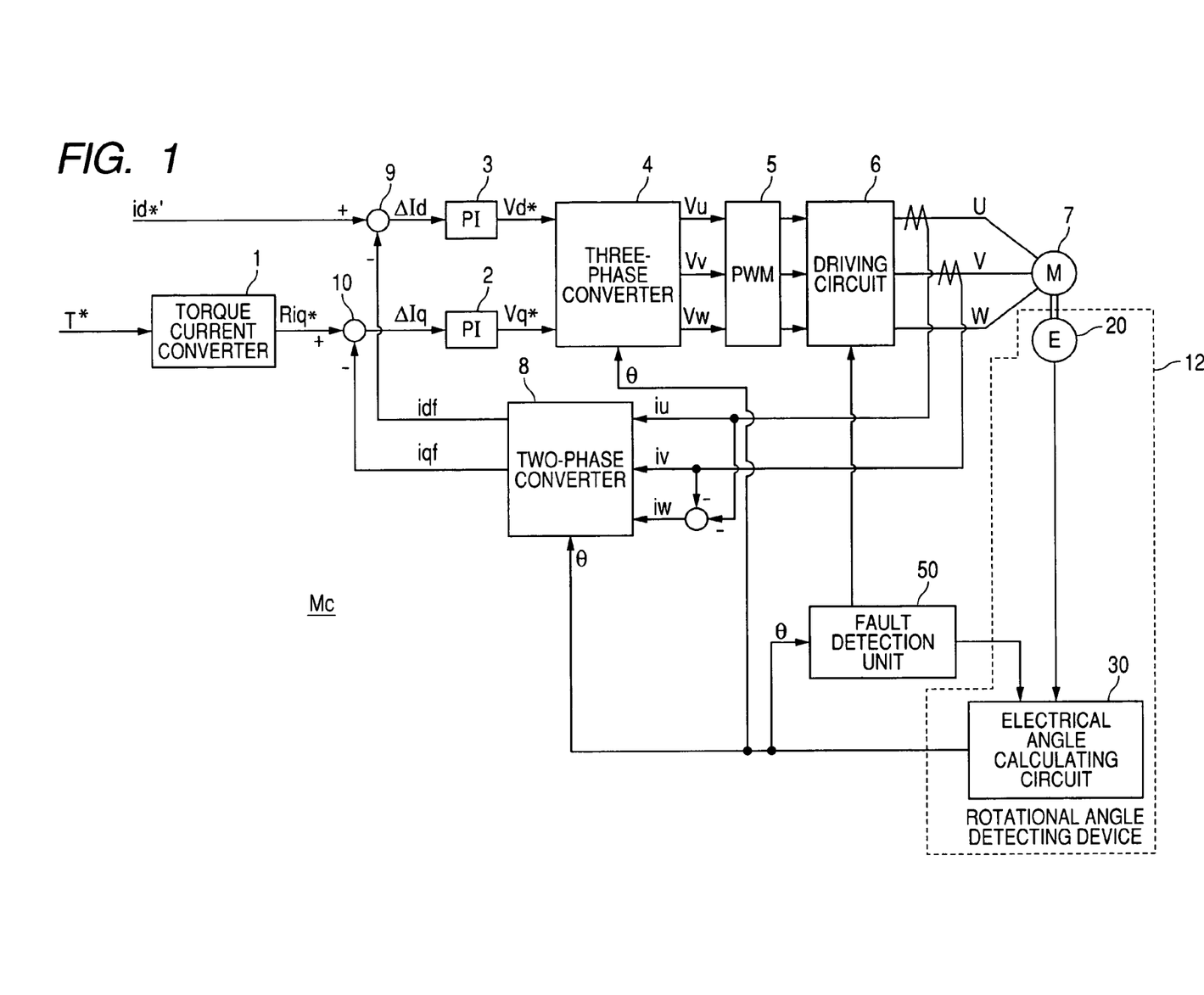
FIG. 1 is a block diagram of a motor controller according to an embodiment of the present invention.

FIG. 1 is a block diagram of a motor controller according to this embodiment. An electrically operated power steering unit of a vehicle is, for example, driven by a motor operated under control of a motor controller Mc. As described later in detail, the controller Mc has a rotational angle detecting device and a fault detection unit for detecting a fault occurred in the device. The controller Mc receives electric power from a power source such as a battery (not shown) of the vehicle.

As shown in FIG. 1, the controller Mc adjusts a three-phase alternating current in response to a torque instruction $\tau^*$ and a magnetizing current id*, and a brushless motor 7 receives the alternating current from the controller Mc. The motor 7 has a cylindrical stator and a columnar rotor disposed so as to be surrounded by the stator. The rotor has a plurality of magnetic poles aligned along a circumferential direction of the stator. The rotor is rotated on its center axis in response to the alternating current received in the stator, a rotational force of the rotor is transmitted to the steering unit, and the steering unit is driven.

A resolver 20 connected with the motor 7 detects the rotation of the rotor and produces a sine-wave phase signal $Ss(\theta)$ and a cosine-wave phase signal $Sc(\theta)$ respectively, having phases corresponding to an electrical angle $\theta$ of the motor 7 (i.e., rotational angle $\theta$ of the rotor with respect to the stator). An electrical angle calculating circuit 30 calculates the electrical angle $\theta$ from the signals $Ss(\theta)$ and $Sc(\theta)$. A rotational angle detecting device 12 according to this embodiment is composed of the resolver 20 and the calculating circuit 30.

In the controller Mc, a torque current converter 1 receives a signal of the torque instruction $\tau^*$ from a torque sensor (not shown) of the vehicle and converts the torque instruction signal into a target q-axis current Riq*. This current Riq* passes through a comparator 10 and a proportional integral (PI) controller 2 and is output as an instruction value Vq* of a q-axis voltage.

The controller Mc also receives a magnetizing current id* as another instruction value. This current id* passes through a comparator 9 and a proportional integral (PI) controller 3 and is output as an instruction value Vd* of a d-axis voltage. The d-axis and q-axis are defined in a rotational rectangular coordinates system. The d-axis is set so as to be directed from an S magnetic pole to an N magnetic pole in the rotor. The q-axis is set to be orthogonal to the d-axis on a plane perpendicular to a rotation axis of the rotor. An original point of the coordinates system is placed on the rotation axis of the rotor.

A three-phase converter 4 converts the q-axis voltage Vq* and the d-axis voltage Vd* into a U-phase voltage Vu, a V-phase voltage Vv and a W-phase voltage Vw on the basis of the electrical angle $\theta$ received from the circuit 30. A pulse width modulator (PWM) 5 pulse-width-modulates each of the U-phase, V-phase and W-phase voltages Vu, Vv and Vw to produce U-phase, V-phase and W-phase pulse currents. A driving circuit 6 generates U-phase, V-phase and W-phase currents from the U-phase, V-phase and W-phase pulse currents and supplies these generated currents to the motor 7 through U-phase, V-phase and W-phase conductive lines. Therefore, the motor 7 is driven in response to the received currents under control of the controller Mc.

A U-phase assist current iu and a V-phase assist current iv are transmitted from the U-phase and V-phase conductive lines to a two-phase converter 8. Further, a W-phase assist current iw is produced from the assist currents iu and iv and is transmitted to the converter 8. The converter 8 converts the assist currents iu, iv and iw into a d-axis assist current idf and a q-axis assist current iqf on the basis of the electrical angle $\theta$ received from the circuit 30.

The assist current idf is fed back to the comparators 9 and 10 and is compared with the currents id* and Riq*. When there is a difference $\Delta Id = |idf - id^*|$ between the currents idf and id*, the controller 3 adjusts the d-axis voltage Vd* on the basis of the difference $\Delta Id$ so as to approach the difference $\Delta Id$ to zero. When there is a difference $\Delta Iq = |iqf - Riq^*|$ between the currents iqf and Riq*, the controller 2 adjusts the q-axis voltage Vq* on the basis of the difference ΔIq so as to approach the difference ΔIq to zero. This feed back and the adjustment of the voltages Vd* and Vq* are repeatedly performed until the differences ΔId and Δiq are converged to zero.

The controller Mc further has a fault detection unit 50 for detecting a fault, emergency or malfunction of the rotational angle detecting device 12 (i.e., combination of resolver 20 and electrical angle calculating circuit 30) on the basis of the electrical angle θ, the signals Ss(θ) and Sc(θ), and other signals received from the calculating circuit 30.

Figure 2:
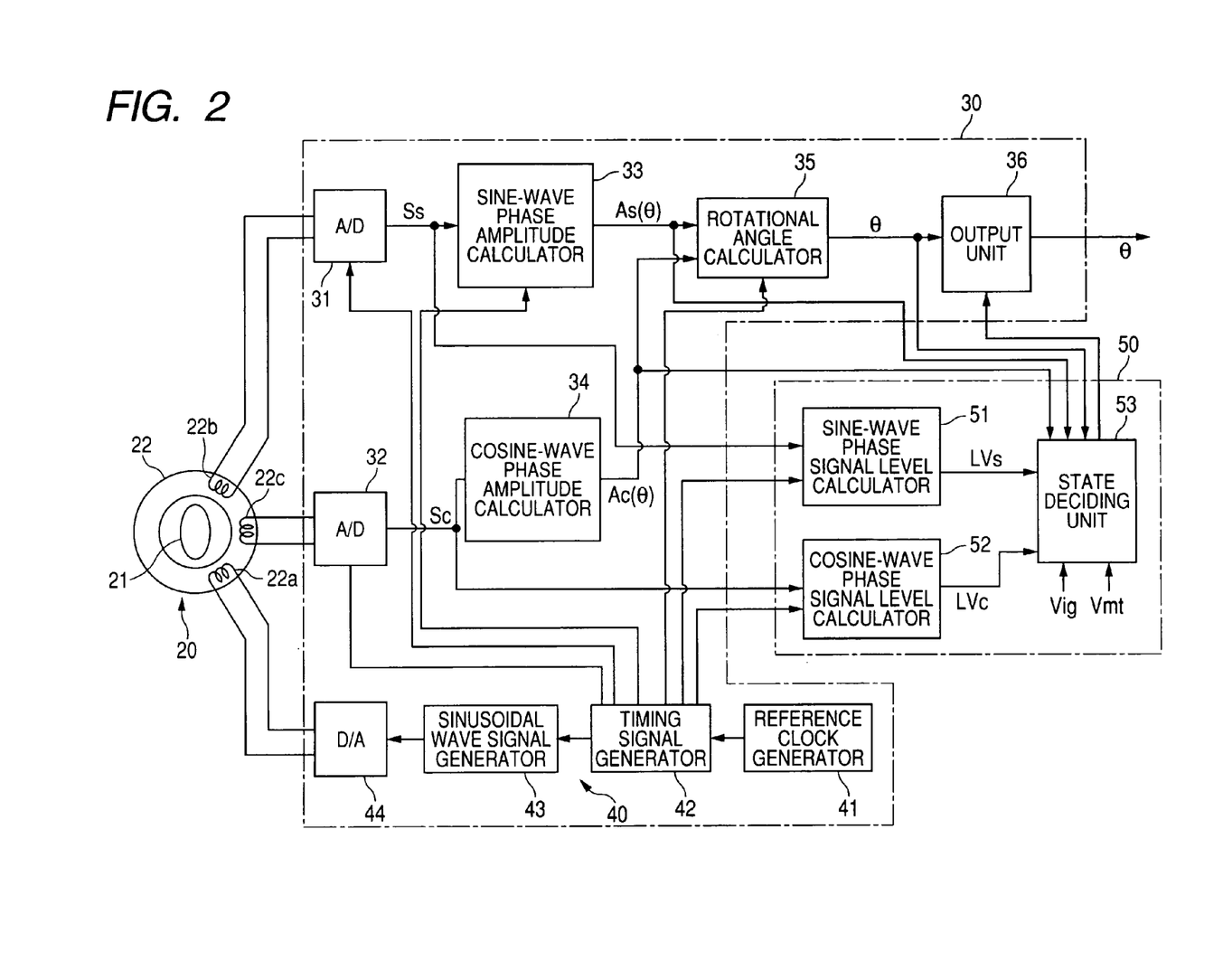
FIG. 2 is a block diagram of an electrical angle calculating circuit and a fault detecting unit shown in FIG. 1 and schematically shows the structure of a resolver.
Figure 3:
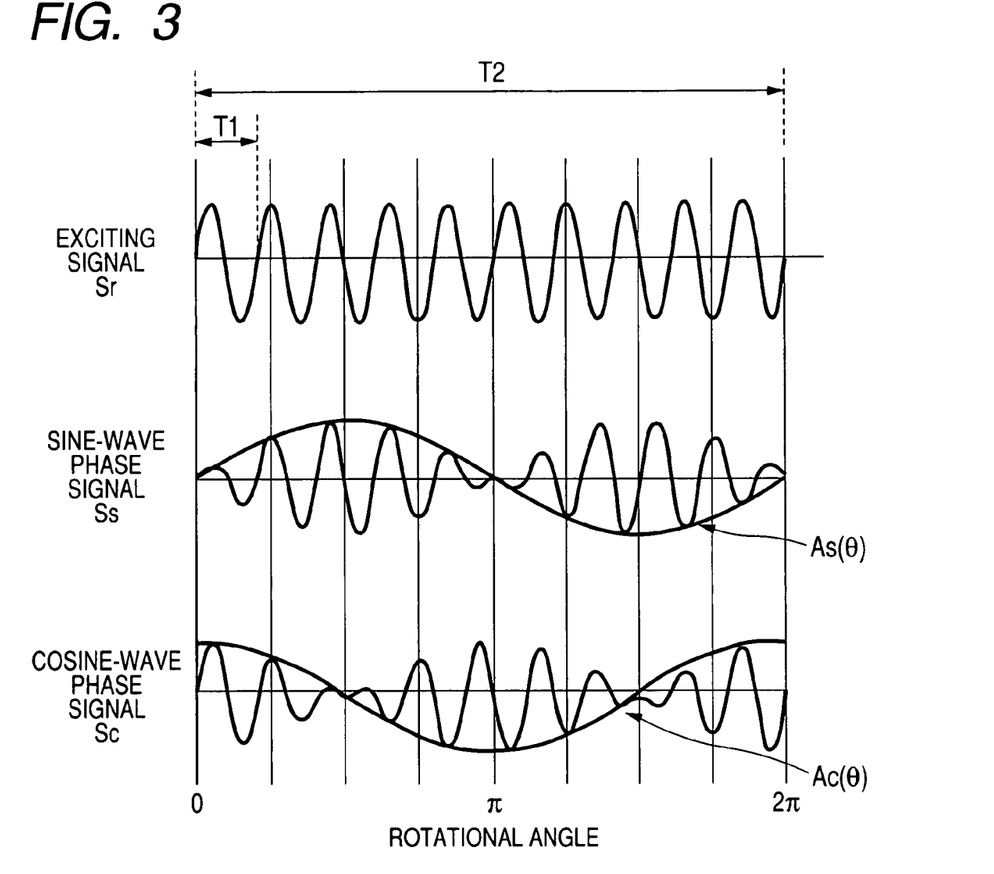
FIG. 3 shows a waveform of each signal input and output to/from the resolver shown in FIG. 2.

FIG. 2 is a block diagram of the circuit 30 and the detecting unit 50 and schematically shows the structure of the resolver 20, and FIG. 3 shows a waveform of each of signals input and output to/from the resolver 20.

As shown in FIG. 2, the resolver 20 has a columnar rotor 21 fixedly connected with the rotor of the motor 7 and a cylindrical stator 22 fixedly connected with the stator of the motor 7. The stator 22 is disposed so as to surround the rotor 21, and the rotor 21 and stator 22 have a rotational axis in common. A rotational angle of the rotor 21 with respect to the stator 22 accords with the rotational angle in the motor 7. The rotor 21 is formed in an elliptical shape in section. The resolver 20 has a plurality of coils disposed at equal intervals along a circumferential direction of the stator 22. Each coil of the resolver 20 acts as an exciting coil, a sine-wave phase coil or a cosine-wave phase coil. An exciting coil 22a, a sine-wave phase coil 22b and a cosine-wave phase coil 22c are representatively shown in FIG. 2. A current flows through each of the coils 22b and 22c in response to a current supplied to the coil 22a.

The circuit 30 has an exciting signal generating section 40 for generating an exciting signal Sr. This section 40 has a reference clock generator 41, a timing signal generator 42, a sinusoidal wave signal generator 43 and a digital-to-analog (D/A) converter 44. The generator 41 generates a clock signal as a reference of the measurement. The generator 42 generates various timing control signals in response to the clock signal to set timings for various calculations. The generator 43 has a sinusoidal wave table. In this table, pieces of sampling data indicating amplitudes of a sinusoidal wave are stored such that the phase angle of the sinusoidal wave is increased bit by bit. The phase angle of the sinusoidal wave ranges from 0 to 2π radians, and phase angle values of the sinusoidal wave are associated with a plurality of addresses. The generator 43 generates a digital sinusoidal wave signal by reading out the pieces of sampling data one by one from the table in synchronization with one timing control signal of the generator 42. The converter 44 converts the wave signal of the generator 43 into an analog exciting signal Sr (Sr(t)=Ar×sin $\omega_0$t). As shown in FIG. 3, the exciting signal Sr is periodically changed with time in a sinusoidal shape in a predetermined cycle T1 (=2π/$\omega_0$) sufficiently shorter than a cycle T2 of the rotation of the rotor 21.

The exciting coil 22a receives the exciting signal Sr, so that each of the phase coils 22b and 22c generates a current. More specifically, when the rotor 21 is rotated in response to the rotation in the motor 7 so as to change a rotational angle θ of the rotor 21 with respect to the stator 22, an analog sine-wave phase signal Ss and an analog cosine-wave phase signal Sc are output from the phase coils 22b and 22c in response to the exciting signal Sr, respectively. As shown in FIG. 3, each phase signal is periodically changed in synchronization with the exciting signal. Because the rotor 21 is formed in an elliptical shape in section, an amplitude of each of the phase signals Ss and Sc is modulated in a sinusoidal waveform and is changed with the rotational angle θ in a cycle of 2 radians (i.e., cycle T2 of rotation of rotor 21). Further, a phase of the phase signal Ss is opposite to a phase of the exciting signal Sr in a region ranging from π to 2π radians of the rotational angle θ, while the phase signal Ss has the same phase as that of the exciting signal Sr in the other region ranging from 0 to π radians of the rotational angle θ. In contrast, a phase of the phase signal Sc is opposite to a phase of the exciting signal Sr in a region ranging from π/2 to 3π/2 radians of the rotational angle θ, while the phase signal Ss has the same phase as that of the exciting signal Sr in the other region ranging from 3π/2 to π/2 radians of the rotational angle θ. Therefore, a sinusoidal waveform indicating a change of the amplitude of the sine-wave phase signal is shifted by π/2 radians of the rotational angle from that of the cosine-wave phase signal.

The circuit 30 further has an analog-to-digital (A/D) converter 31, and A/D converter 32, a sine-wave phase amplitude calculator 33 and a cosine-wave phase amplitude calculator 34. The A/D converters 31 and 32 sample the analog phase signals Ss and Sc from the coils 22b and 22c at a predetermined sampling rate in synchronization with the timing control signals of the generator 42, respectively. This sampling rate is set at a comparatively high rate such that the sinusoidal wave of the exciting signal Sr can be reproduced. In other words, the sampling rate is set such that the amplitude-modulated sinusoidal wave of each phase signal corresponding to one cycle T1 (=2π/$\omega_0$) of the exciting signal Sr can be reproduced. Then, the A/D converters 31 and 32 convert the sampled analog signals into a digital sine-wave phase signal Ss and a digital cosine-wave phase signal Sc, respectively.

The amplitude calculator 33 receives sampled values (i.e., amplitudes) of the phase signal Ss from the converter 31 in synchronization with one timing control signal of the generator 42, and determines an approximate curve function Ps(t) by approximately expressing each set of sampled values of the phase signal Ss corresponding to one cycle T1 (=2π/$\omega_0$) of the exciting signal Sr by a sinusoidal wave function having the same frequency and phase as those of the exciting signal Sr (=Ar×sin $\omega_0$t). Then, the calculator 33 calculates both an amplitude value As(θ) and an offset value Aso of the function Ps(t). The function Ps(t) is expressed according to a first equation (1).

$$Ps(t)=As(\theta)\times\sin \omega_0 + Aso \quad (1)$$

The amplitude As(θ) is changed with the rotational angle θ and is called a sine-wave phase amplitude signal. The offset value Aso is equivalent to a bias voltage value of the phase signal Ss. To determine the function Ps(t), a least square approximation may be used.

In the same manner, the amplitude calculator 34 receives sampled values (i.e., amplitudes) of the cosine-wave phase signal Sc from the converter 32 in synchronization with one timing control signal of the generator 42 and determines an approximate curve function Pc(t) by approximately expressing each set of sampled values of the phase signal Sc corresponding to one cycle of the exciting signal Sr by another sinusoidal wave function having the same frequency and phase as those of the exciting signal Sr (=Ar×sin $\omega_0$t). Then, the calculator 34 calculates both an amplitude value Ac(θ) and an offset value Aco of the function Pc(t). The function Pc(t) is expressed according to a second equation (2).

$$Pc(t)=Ac(\theta)\times\sin \omega_0 + Aco \quad (2)$$

The amplitude value Ac(θ) is changed with the rotational angle θ and is called a cosine-wave phase amplitude signal. The offset value Aco is equivalent to a bias voltage value of the phase signal Sc.

As shown in FIG. 3, phases of the amplitude signals As(θ) and Ac(θ) differ from each other by an electrical angle of π/2 radians, and each of the amplitude signals As(θ) and Ac(θ) has a sinusoidal waveform set in a cycle of 2π radians of the rotational angle θ. Further, when the amplitude signals As(θ) and Ac(θ) are determined with high precision in the circuit 30 from the phase signals Ss and Sc output from the resolver operated in a normal condition, the amplitude of the amplitude signal As(θ) becomes the same as the amplitude of the amplitude signal Ac(θ). Therefore, the amplitude signals As(θ) and Ac(θ) each having an amplitude A can be expressed according to equations (3) and (4).

$$As(\theta) = A \times \sin\theta \quad (3)$$

$$Ac(\theta) = A \times \cos\theta \quad (4)$$

The amplitude A is determined based on values of the currents induced in the coils 22b and 22c of the resolver 20, and the current values depend on the resolver 20 and a voltage applied to the coil 22a from the generating section 40 denoting peripheral circuits of the resolver 20.

As shown in FIG. 2, the circuit 30 further has a rotational angle calculator 35 and an output unit 36. The angle calculator 35 calculates a rotational angle θ of the rotor 21 with respect to the stator 22 from the amplitude signals As(θ) and Ac(θ) of the calculators 33 and 34 according to a fifth equation (5).

$$\theta = \tan^{-1}(As(\theta)/Ac(\theta)) \quad (5)$$

The output unit 36 outputs the rotational angle θ to the converters 4 and 8.

Figure 4:
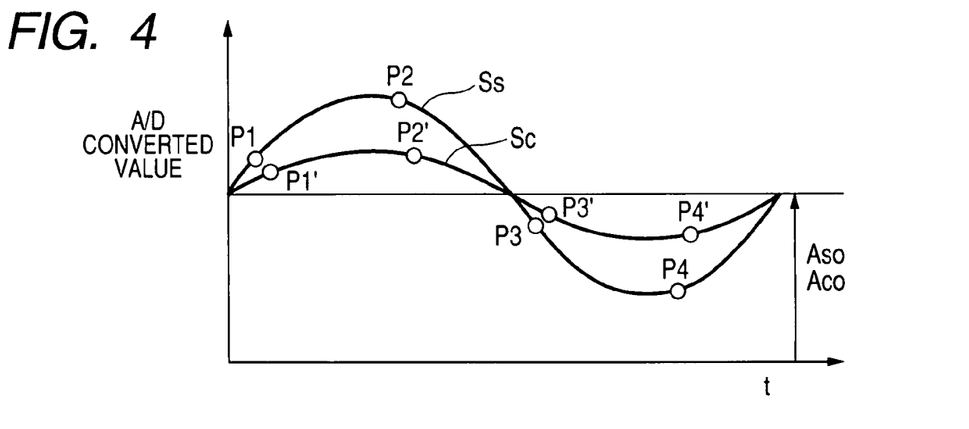
FIG. 4 is a view showing sampling points equally placed on a sinusoidal waveform corresponding to one cycle of each of the signals output from the resolver.

The fault detection unit 50 has a sine-wave phase signal level calculator 51, a cosine-wave phase signal level calculator 52, and a state deciding unit 53. The calculator 51 receives sampled values of a current cycle T1 (=2π/ω₀) of the sine-wave phase signal Ss from the converter 31 in synchronization with one timing control signal of the generator 42 and calculates an average level of the phase signal Ss from a predetermined number of sampled values disposed at equal intervals along a time axis. FIG. 4 is a view showing sampling points equally placed on a sinusoidal waveform corresponding to one cycle of each of the phase signals Ss and Sc. As shown in FIG. 4, four sampled values at points P1, P2, P3 and P4 disposed at equal intervals of π/2ω₀ are, for example, selected from sampled values in one cycle of the phase signal Ss, and an average of the selected sampled values is calculated to obtain a sine-wave phase signal level LVs. When no fault or malfunction has occurred in the rotational angle detecting device 12 (i.e., resolver 20 and circuit 30), the phase signal Ss is normally generated, and the level LVs becomes equal to the offset value Aso.

In the same manner, the calculator 52 receives sampled values of a current cycle T1 (=2π₀) of the cosine-wave phase signal Sc from the converter 32 in synchronization with one timing control signal of the generator 42 and calculates an average level of the phase signal Sc from a predetermined number of sampled values disposed at equal intervals along a time axis. For example, as shown in FIG. 4, four sampled values at points P1', P2', P3' and P4' disposed at equal intervals of π/2ω₀ are selected from sampled values in one cycle of the phase signal Sc, and an average of the selected sampled values is calculated to obtain a cosine-wave phase signal level LVc. When no fault or malfunction has occurred in the rotational angle detecting device 12 (i.e., resolver 20 and circuit 30), the phase signal Sc is normally generated, and the level LVc becomes equal to the offset value Aco.

Figure 5:
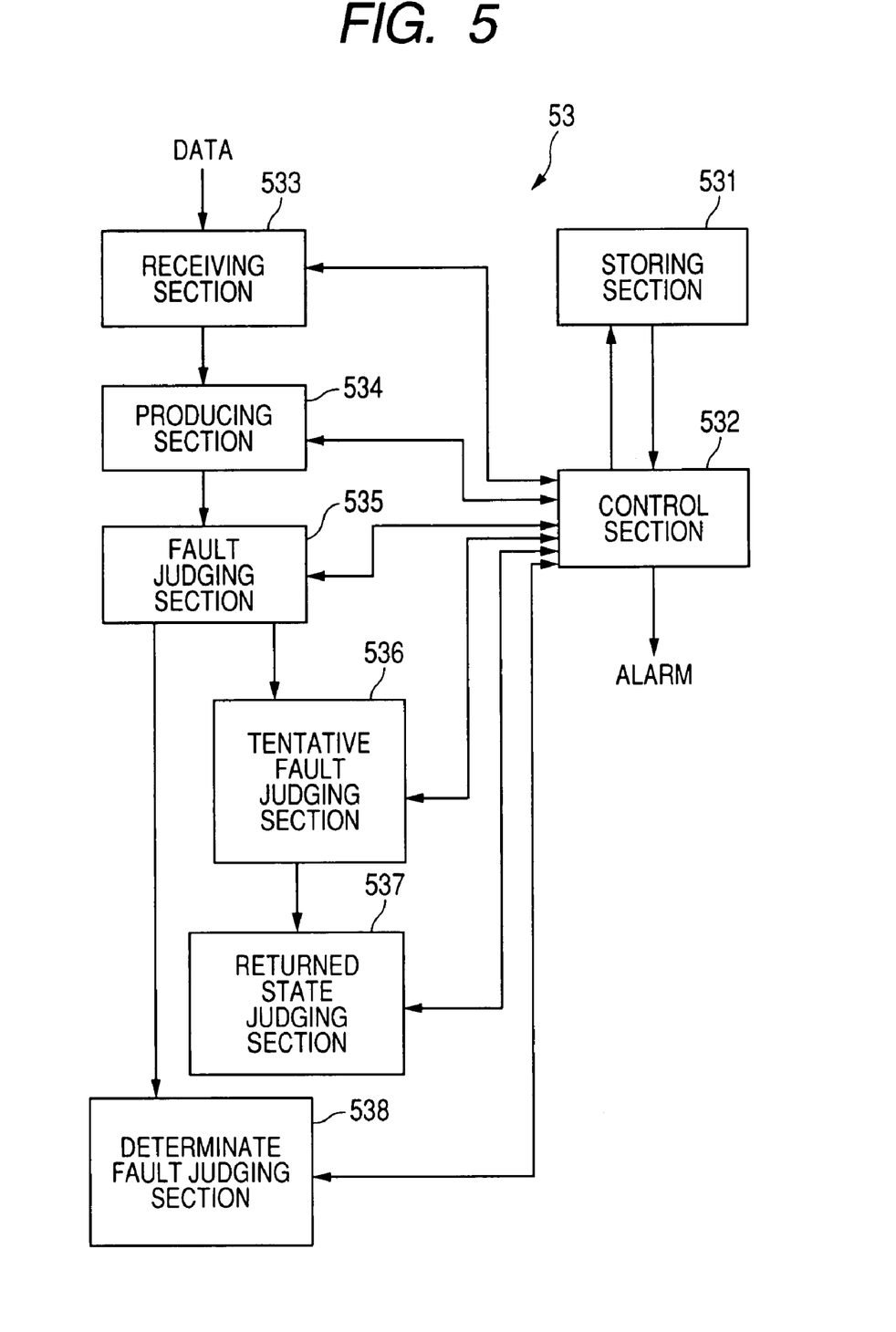
FIG. 5 is a block diagram of a state determining unit shown in FIG. 2 according to this embodiment.

FIG. 5 is a block diagram of the state deciding unit 53 according to this embodiment. As shown in FIG. 5, the unit 53 has a storing section 531 for storing a state determining program, a control section 532 for reading out the program from the section 531 and repeatedly executing this program every predetermined repetition period of time to control other sections of the unit 53, a receiving section 533 for receiving data, a producing section 534 for producing a fault judging value from the data, a fault judging section 535 for judging based on the fault judging value that a fault has probably occurred in the detecting device 12, a tentative fault judging section 536 for tentatively judging the detecting device 12 to be in a fault state, a returned state judging section 537 for judging the detecting device 12 to have returned to a normal state, and a determinate fault judging section 538 for finally judging the detecting device 12 to be in a fault state.

More specifically, the receiving section 533 receives the amplitude signals As(θ) and Ac(θ), the rotational angle θ, and the signal levels LVs and LVc from the calculators 33, 34, 35, 51 and 52 each time the program is executed in the control section 532. Further, the receiving section 533 receives a power source voltage value Vig and an exciting voltage value Vmt from peripheral circuits (not shown). The voltage value Vig denotes a voltage of a battery (not shown). The voltage value Vmt denotes a voltage applied to the coil 22a, and the amplitude Ar of the exciting signal Sr is determined based on the voltage value Vmt. The usage of these values Vig and Vmt are well known, so that detailed descriptions of the values Vig and Vmt are omitted.

The producing section 534 produces a fault judging value determined from at least one of the sine-wave phase signal Ss and the cosine-wave phase signal Sc. When detecting the fault judging value placed out of a normal range, the judging section 535 judges that a fault has probably occurred in the detecting device 12. The tentative fault judging section 536 judges the detecting device 12 to be in a tentative fault state, in response to continuation of the judgment for a first predetermined period of time.

The state return judging section 537 examines whether the rotational angle θ is changed over its entire range and judges the detecting device 12, judged to be in the tentative fault state, to have returned to a normal state, in response to the rotational angle θ changed over the entire range and the fault judging value always placed within the normal range during the change of the rotational angle over the entire range. The determinate fault judging section 538 judges the detecting device 12 to be in a determinate fault state and determines occurrence of a fault in the detecting device 12, in response to continuation of the judgment by the judging section 535 for a second predetermined period of time which is longer than the first predetermined period of time.

In response to the judgment of the judging section 536, the control section 532 controls the output unit 36 to stop outputting the rotational angle θ. Further, in response to the judgment of the judging section 537, the control section 532 controls the output unit 36 to restart outputting the rotational angle θ. Moreover, in response to the judgment of the judging section 538, the control section 532 controls an alarm (not shown) and/or a diagnosis recorder (not shown) to output a warning sound indicating the occurrence of a fault or malfunction and/or to record the judged state as diagnosis data.

Figure 6:
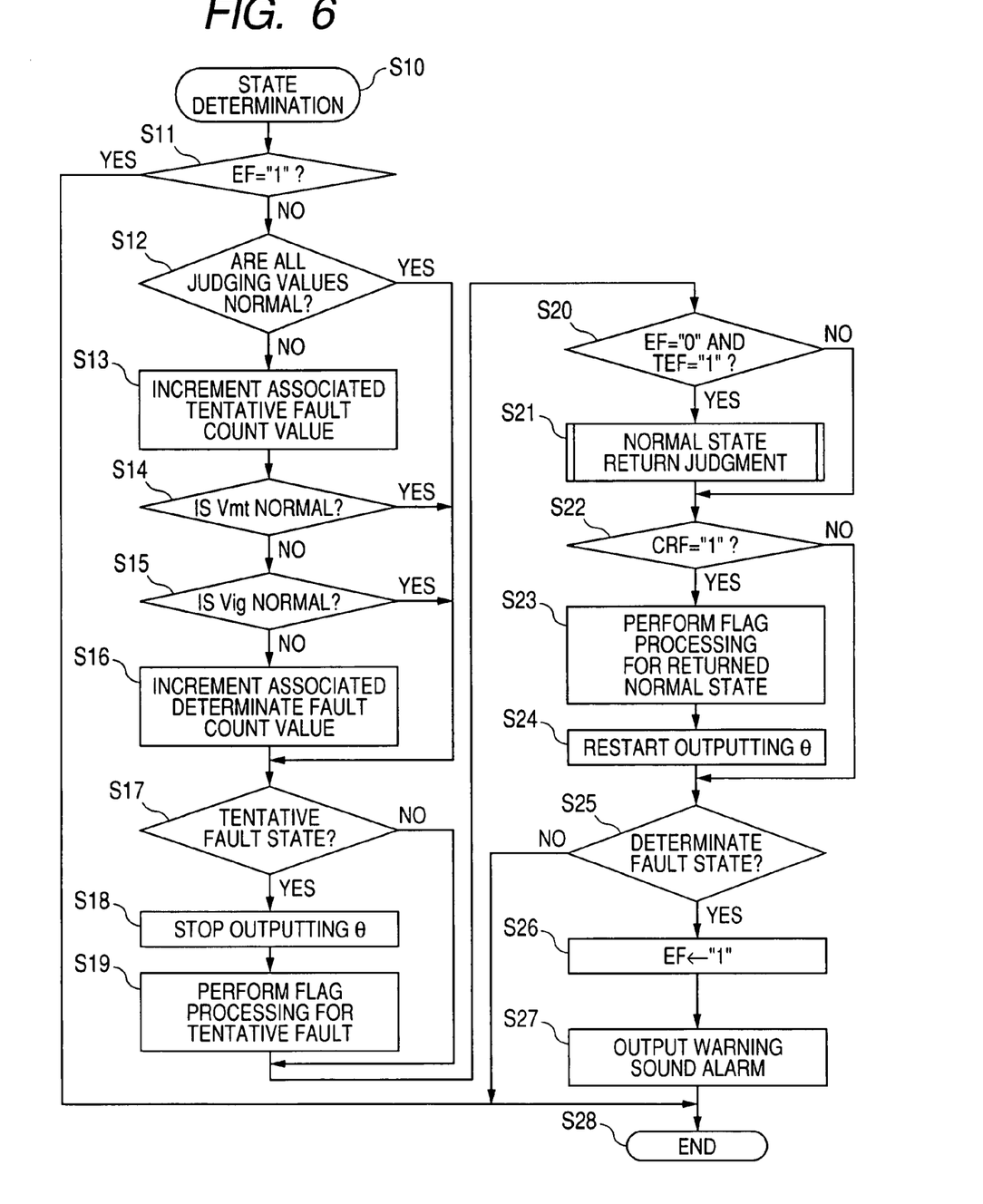
FIG. 6 is a flow chart showing the procedure for determining a state of a detecting device shown in FIG. 1.

FIG. 6 is a flow chart showing the procedure for determining a state of the detecting device 12 according to the state determining program. An example of the processing performed in the unit 53 is described in detail with reference to FIG. 6.

When an ignition switch (not shown) is turned on, the detecting device 12 starts detecting a rotational angle, and the fault detection unit 50 starts detecting the occurrence of a fault in the detecting device 12 by executing a routine of the state determination based on the state determining program every predetermined repetition period of time under control of the control section 532 (step S10).

At step S11, the section 532 judges whether a determinate fault flag EF is set at "1". The flag EF is initially set at "0" when the ignition switch is turned on. The flag EF set at "1" indicates that the detecting device 12 is in a determinate fault state, while the flag EF set at "0" indicates that the detecting device 12 is not in a determinate fault state. When the flag EF has been already set at "1" in the state determining routine previously executed, this routine is finished. In contrast, when the flag EF is set at "0" the procedure proceeds to step S12.

At step S12, the section 535 calculates a square root of a sum of the amplitude signal As(θ) squared and the amplitude signal Ac(θ) squared as a first resolver signal judging value Ass, sets the level value LVs as a second resolver signal judging value, sets the level value LVc as a third resolver signal judging value, and calculates a fourth resolver signal judging value |Δθ|. These judging values represents the fault judging value. The judging value Ass is expressed according to a sixth equation.

$$Ass(\theta)=(As(\theta)^2+Ac(\theta)^2)^{1/2} \quad (6)$$

However, the sum $Ass^2$ may be set as the first resolver signal judging value. The judging value |Δθ| is calculated from the rotational angle $\theta_{new}$ received in this current routine and the rotational angle $\theta_{old}$ received in the routine preceding the current routine and stored in the section 531. The judging value |Δθ| is expressed according to a seventh equation.

$$|\Delta\theta|=|\theta_{new}-\theta_{old}| \quad (7)$$

A normal range is predetermined for each of the judging values Ass, LVs, LVc and |Δθ|. A normal range of the judging value Ass is set between Amin and Amax. The reason that this normal range can be set between a minimum value and a maximum value is described with reference to FIG. 7.

Figure 7:
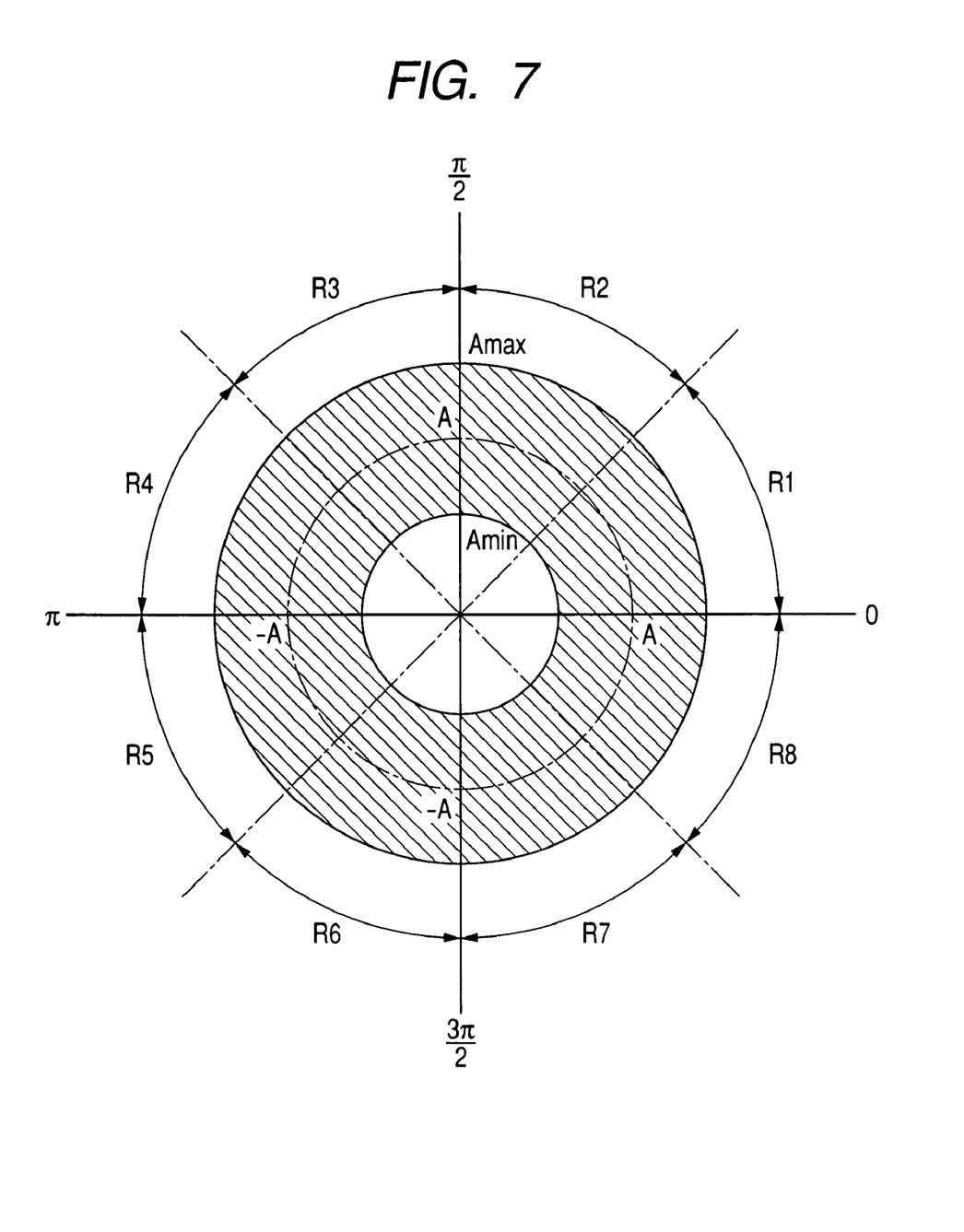
FIG. 7 is a view showing a normal region of a coordinate position defined by amplitude signals shown in FIG. 3 in a rectangular coordinates system.

FIG. 7 a view showing a normal region of a coordinate position defined by the amplitude signals As(θ) and Ac(θ) in a rectangular coordinates system. In the coordinates system shown in FIG. 7, an X-axis indicates an amplitude of the amplitude signal Ac(θ) and a Y-axis indicates an amplitude of the amplitude signal As(θ). When no fault or malfunction has occurred in the detecting device 12, the amplitude signals As(θ) and Ac(θ) satisfy the equations As(θ)=A×sin θ and Ac(θ)=A×cos θ, as described before. A coordinate position (Ac(θ), As(θ)) in the system is ideally moved on a circle (indicated by a dot-dash-line in FIG. 7) having a radius set at A in response to a change of the rotational angle θ. However, even though no fault or malfunction has occurred in the detecting device 12, the coordinate position is slightly shifted from the circle due to a fluctuation in the operation of the resolver 20 and its peripheral circuits. However, when a fault or malfunction has occurred in the detecting device 12, the coordinate position is considerably shifted from the circle. In this embodiment, a doughnut-shaped region (i.e., hatched region) between a full line circle having a radius of Amin and a full line circle having a radius of Amax is set as a normal region for the coordinate position. Because the judging value Ass is equal to a distance between an original point of the coordinates system and the coordinate position, the normal range of the judging value Ass can be set between Amin and Amax.

A normal range of the judging value LVs is described. When the phase signal Ss is normally generated, in other words, when the phase signal Ss is obtained in the detecting device 12 set in a normal sate, the value LVs is equal to the offset value Aso. A normal range of the judging value LVs is set between a first value Aso−ΔA slightly lower than the value Aso and a second value Aso+ΔA slightly higher than the value Aso.

A normal range of the judging value LVc is described. When the phase signal Sc is normally generated, the level value LVc is equal to the offset value Aco. A normal range of the judging value LVc is set between a first value Aco−ΔA slightly lower than the value Aco and a second value Aco+ΔA slightly higher than the value Aco.

A normal range of the judging value |Δθ| is set to be equal to or lower than an upper limit Δθ max predetermined based on experiments in which the steering unit is driven by the motor 7 under control of the controller Mc. This normal range is expressed according to a relationship:

$$0 \leq |\Delta\theta| \leq \Delta\theta\max.$$

The section 535 judges whether each of the judging values is placed within its normal range. When each judging value is placed within the normal range, the section 535 judges that the detecting device 12 is in a normal state (affirmative judgment). In contrast, when at least one of the judging values is placed out of the normal range (negative judgment), the section 535 judges that a fault or malfunction has probably occurred in the detecting device 12. In case of the affirmative judgment, the procedure jumps to step S17. In case of the negative judgment, the procedure proceeds to step S13.

At step S13, among first, second, third and fourth tentative fault count values TCNT1, TCNT2, TCNT3 and TCNT4, respectively, associated with the first to fourth resolver signal judging values, the section 536 increments by one the count value associated with each judging value judged to be placed out of its normal range. Each of the count values TCNT1 to TCNT4 is initially set at "0" when the ignition switch is turned on.

At step S14, the section 538 judges whether the exciting voltage value Vmt is equal or close to its normal value Vmt0. At step S15, the section 538 judges whether the power source voltage value Vig is equal or close to its normal value Vig0. In case of the negative judgment at step S14 and/or S15, the section 532 realizes that each judging value placed out of its normal range is obtained due to the voltage value Vmt or Vig abnormally generated and determines that no fault or malfunction has occurred in the detecting device 12. Therefore, the procedure jumps to step S17. In contrast, in case of the affirmative judgments at steps S14 and S15, the section 532 realizes the normal operation of the battery and the normal application of the exciting voltage to the coil 22a. Therefore, the section 532 recognizes that a probability of the occurrence of a fault or malfunction in the detecting device 12 is heightened, and the procedure proceeds to step S16. The judgments at steps S14 and S15 are made to deliberately determine the occurrence of a fault in the detecting device 12. However, the steps S14 and S15 may be omitted from this state determining routine.

At step S16, among first, second, third and fourth determinate fault count values CNT1, CNT2, CNT3 and CNT4, respectively, associated with the first to fourth resolver signal judging values, the count value associated with each judging value judged to be placed out of its normal range is incremented by one in the section 538. Each of the count values CNT1 to CNT4 has been initially set at "0" when the ignition switch is turned on. Then, the procedure proceeds to step S17.

At step S17, the section 536 judges whether the detecting device 12 is in a tentative fault state. More specifically, first, second, third and fourth tentative judgment reference values TN1, TN2, TN3 and TN4, respectively, associated with the count values TCNT1 to TCNT4 are preset. The section 536 judges whether at least one of the count values TCNT1 to TCNT4 is higher than the associated reference value. When the negative judgment is obtained at step S12 many times during the routines repeatedly executed, at least one of count values can become higher than the associated reference value. In case of the affirmative judgment at step S17, the section 536 tentatively determines that a fault has occurred in the detecting device 12 and judges the detecting device 12 to be in a tentative fault state, and the procedure proceeds to steps S18 and S19. In contrast, in case of the negative judgment at step S17, the section 536 judges that the detecting device 12 is still in a normal state, and the procedure jumps to step S20.

At step S18, the section 532 instructs the outputting unit 36 to stop outputting the rotational angle θ. Therefore, no rotational angle θ is received in each of the converters 4 and 8, so that the unit 50 prevents the motor controller Mc from controlling the motor 7 on the basis of rotational angle θ erroneously calculated. For example, each of the converters 4 and 8 performs the conversion on the basis of a rate of a change of the rotational angle θ previously received.

At step S19, the section 532 performs the flag processing for the tentative fault. More specifically, a tentative fault flag TEF is set at "1", each of first to eighth region flags FL(1) to FL(8) is initially set at "0", and a tentative fault canceling flag CRF is initially set at "0". Because this flag processing is performed, each of the count values TCNT is reset at "0" to prevent the section 536 from again judging, at step S17 of a next routine, the detecting device 12 to be in the tentative fault state. The flag TEF has been initially set at "0" when an ignition switch is turned on. The flag TEF set at "1" indicates that the detecting device 12 is in a tentative fault state, while the flag TEF set at "0" indicates that the detecting device 12 is not in a tentative fault state. Because the tentative fault state of the detecting device 12 has been determined based on the count values TCNT at step S17, the flag TEF is set at "1". The tentative fault canceling flag CRF set at "0" indicates that a tentative fault state is not cancelled, while the tentative fault canceling flag CRF set at "1" indicates that a tentative fault state is cancelled.

The flags FL(i) (i=1, 2, - - - , 8) are used to judge whether the rotational angle θ is changed over its entire range from 0 to 2π radians. More specifically, the entire angle range is equally divided into eight angle regions, respectively, associated with the flags FL(i). Each flag FL(i) set at "1" indicates that the rotational angle θ is placed at the corresponding angle region, while the flag FL(i) set at "0" indicates that the rotational angle θ is not placed at the corresponding angle region. Therefore, it can be estimated that all the flags FL(i) set at "1" together indicate that the rotational angle θ is changed over its entire range from 0 to 2π radians. For example, the flags FL(i) can be used in connection with the coordinate position (Ac(θ), As(θ)) placed within its normal region. More specifically, as shown in FIG. 7, the normal region for the coordinate position (Ac(θ), As(θ)) is equally divided into eight regions R1 to R8 each occupying an angle of π/4. The divided region Ri occupies a range of the angle θ indicated by $(i-1)\cdot\pi/4 \leq \theta < i\cdot\pi/4$. The flag FL(i) set at "1" indicates that the coordinate position is placed within the region Ri, and the flag FL(i) set at "0" indicates that the coordinate position is out of the region Ri.

At step S20, the section 532 judges whether the determinate fault flag EF set at "0" and the tentative fault flag TEF set at "1" are satisfied. In case of the affirmative judgment, the section 532 recognizes that the detecting device 12 is judged to be in the tentative fault state, so that the section 537 executes at step S21 a sub-routine for judging whether the detecting device 12 return to a normal state. In contrast, in case of the negative judgment, the section 532 recognizes that the sub-routine is not required because the detecting device 12 is not in the tentative fault state. Therefore, the procedure jumps to step S22.

Figure 8:
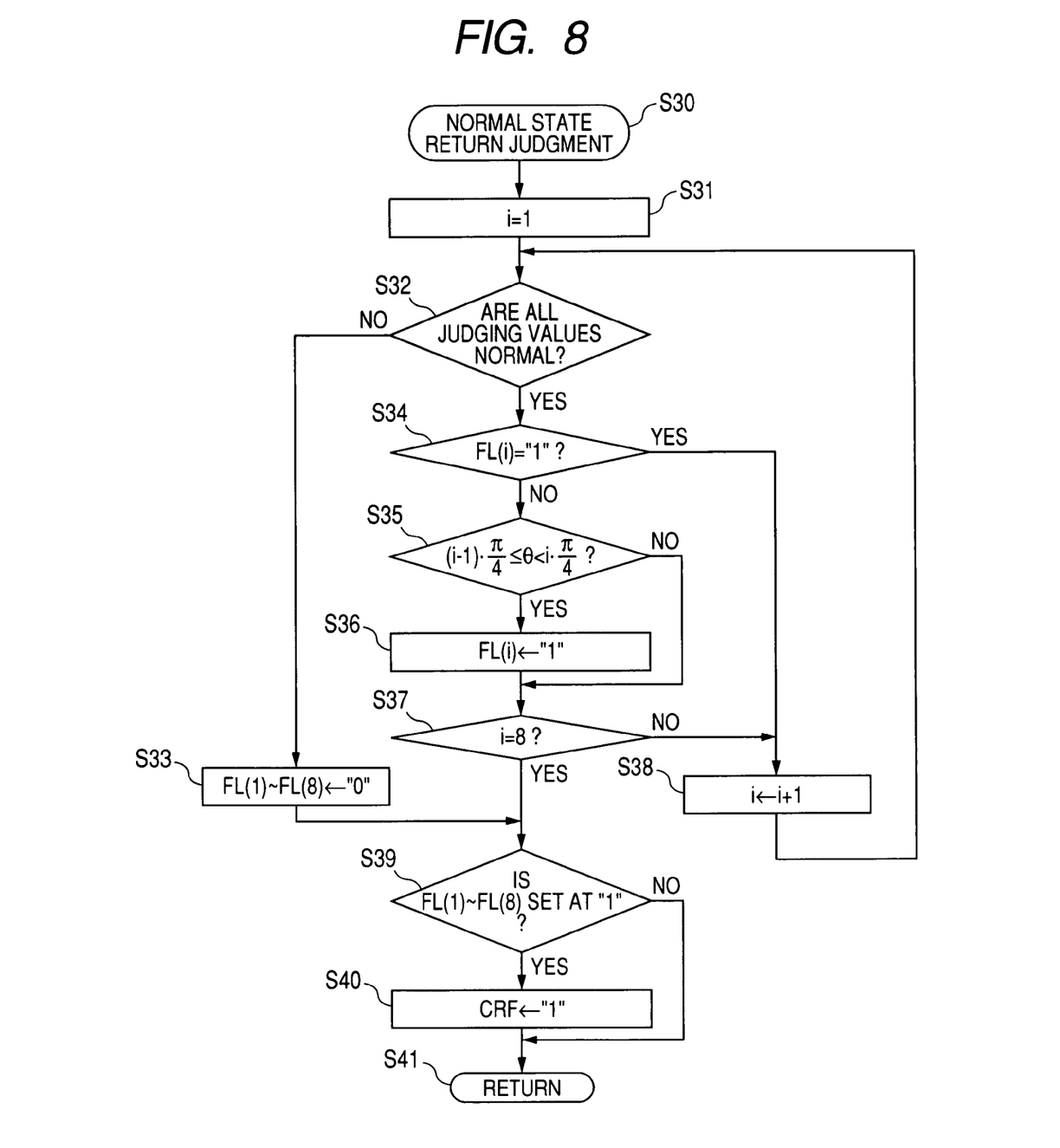
FIG. 8 is a flow chart showing the procedure of a normal state returning judgment.

The normal state return judgment made by the section 537 at step S21 is described with reference to FIG. 8. FIG. 8 is a flow chart showing the procedure of this judgment. In this judgment, the section 537 makes two conditions for judging the detecting device 12 to have returned to a normal state. The first condition is that the rotational angle θ is changed over its entire range from 0 to 2π radians. The second condition is that each of the judging values is placed in its normal range. When these conditions are simultaneously satisfied, the section 537 judges that the detecting device 12 has returned to a normal state.

More specifically, as shown in FIG. 8, when the normal state return judgment is started (step S30), a variable i for the region flag FL(i) is initially set at "1" (step S31). At step S32, in the same manner as step S12, the section 537 judges whether each judging value is placed within its normal range. In case of the affirmative judgment, the section 537 recognizes that the detecting device 12 temporarily returns to a normal state, so that the procedure proceeds to step S34.

At step S34, the section 537 judges whether the region flag FL(i) has been already set at "1" in the previous normal state return judgment. In case of the affirmative judgment, the section 537 recognizes that the rotational angle θ has been placed within a range $(i-1)\cdot\pi/4 \leq \theta < i\cdot\pi/4$, in other words, the coordinate position (Ac(θ), As(θ)) has been placed within the region Ri. Then, the section 537 increments the variable i by one at step S38 and again performs the judgment at step S32. In case of the negative judgment at step S34, the section 537 recognizes that the coordinate position has not yet been placed within the region Ri, so that the procedure proceeds to step S35.

At step S35, the section 537 judges whether the rotational angle θ is now placed within a range $(i-1)\cdot\pi/4 \leq \theta < i\cdot\pi/4$. In case of the affirmative judgment, the section 537 recognizes that the coordinate position is placed within the region Ri. Therefore, the section 537 sets the region flag FL(i) at "1" at step S36, and the procedure proceeds to step S37. In contrast, in case of the negative judgment at step S35, the section 537 recognizes that the coordinate position is not placed within the region Ri, so that the procedure jumps to step S37 without changing the region flag FL(i). That is, the region flag FL(i) is maintained at "0".

At step S37, the section 537 checks whether the judgment at step S34 has been made for all flags FL(i). More specifically, the section 535 judges whether the variable i is equal to 8. When the variable i is lower than 8 (negative judgment), the variable i is incremented by one at step S38, and the procedure returns to step S32. Therefore, on condition that each judging value is continuously set within its normal range, each region flag FL(i) set at "0" is set at "1" when the coordinate position (Ac(θ), As(θ)) is placed within the region Ri associated with the region flag FL(i). In case of the affirmative judgment at step S37, the procedure proceeds to step S39.

In contrast, when at least one of the judging values becomes out of its normal range at step S32 (negative judgment), the section 537 judges that the detecting device 12 fails to return to the normal state. Therefore, the procedure proceeds to step S33. At step S33, the section 537 resets all region flags FL(1) to FL(8) at "0", and the procedure proceeds to step S39. Therefore, even though one of the region flags FL(1) to FL(8) has been changed at "1" in the current sub-routine or previous sub-routine, all flag changes in the normal state return judgment are cleared. In other words, once at least one of the judging values is placed out of its normal range, a normal state return judgment restarted is made so as to again check whether the rotational angle θ is changed over its entire range.

At step S39, the section 537 judges whether all the region flags FL(1) to FL(8) are set at "1" together. When at least one of the region flags FL(1) to FL(8) is set at "0" (negative judgment), the section 537 recognizes that the rotational angle θ has not been yet changed over its entire range. Therefore, this normal state return judgment is finished, and the procedure jumps to step S22. In contrast, when all the region flags FL(1) to FL(8) are set at "1" together (affirmative judgment), the section 537 recognizes that the rotational angle θ has been changed over its entire range while each of the judging values is placed within the normal region, so that the section 537 determines that no fault has occurred in the detecting device 12. Therefore, at step S40, the section 537 sets the tentative fault canceling flag CRF at "1", and the procedure proceeds to step S22.

Returning to FIG. 5, at step S22, the section 537 judges whether the flag CRF is set at "1". In case of the negative judgment, the procedure jumps to step S25 without executing the return to a normal state. In contrast, in case of the affirmative judgment, at step S23, the section 537 performs the flag processing for returned normal state. More specifically, the tentative fault flag TEF and the tentative fault canceling flag CRF are changed at "0" together. Further, the count values TCNT for the tentative fault and the count values CNT for the determinate fault are reset at "0" together. Then, at step S24, the section 532 instructs the outputting unit 36 to restart outputting the rotational angle θ. Therefore, the motor controller Mc can control the motor 7 while using the calculated rotational angle θ.

At step S25, the section 538 judges whether the detecting device 12 is in a determinate fault state. More specifically, first, second, third and fourth determinate judgment reference values N1, N2, N3 and N4, respectively, associated with the count values CNT1 to CNT4 are preset so as to be higher than the reference values TN1, TN2, TN3 and TN4, respectively. The determining section 538 judges whether at least one of the count values CNT1 to CNT4 is higher than the associated reference value. In case of the affirmative judgment at step S25, the section 538 finally decides that a fault has occurred in the detecting device 12 and judges that the detecting device 12 is in a determinate fault state. At step S26, the determining section 538 sets the determinate fault flag EF at "1". Then, at step S27, the section 532 outputs a fault or malfunction warning sound alarm or turns on a fault or malfunction warning lamp, and the section 532 finishes this state determining routine. Because of the flag EF set at "1", in each of state determining routines succeeding this current routine, the affirmative judgment is obtained at step S11, so that none of the steps S12 to S27 are executed. Therefore, the outputting unit 36 continues to stop outputting the rotational angle θ, so that the controller Mc does not use the rotational angle θ currently calculated to control the motor 7.

In case of the negative judgment at step S25, the procedure jumps to step S28, and this state determining routine is finished. Then, the state determining routine is again executed. When the section 536 has judged in the previous routine that the detecting device 12 is in a tentative fault state, because of the setting of the flags TCNT1 to TCNT4 at "0" at step S19 of the previous routine, the negative judgment is obtained at step S17 of the state determining routine again executed. Therefore, the normal state returning judgment is again made in this routine while using the flags FL set in the previous routines. When the state determining routine is repeatedly executed while each of the judging values is continuously placed within its normal range, all the flags FL are finally set at "1" at step S36. Therefore, the fault detection unit 30 can appropriately judge the detecting device 12 to have returned to the normal state.

In this embodiment, the state return judging section 537 makes two conditions for judging the detecting device 12 to have returned to a normal state. The first condition is that the rotational angle θ is changed with time over the entire range from 0 to 2π radians, and the second condition is that each of the judging values is placed within the normal range. When these conditions are simultaneously satisfied, the section 537 judges the detecting device 12 to have returned to a normal state. Therefore, even though the rotational angle θ is changed over the entire range, the detecting device 12 cannot return to a normal state unless each of the judging values is placed within the normal range. Accordingly, when a fault has actually occurred in the detecting device 12, there is little probability that the fault detection unit 50 erroneously judges the detecting device 12 to have returned to a normal state, and the unit 50 can appropriately judge an actual state of the detecting device 12.

Further, the judging condition in the tentative fault judging section 536 is that the number of repetition judgments for one judging value placed out of the normal range reaches a predetermined reference value. In other words, the judging condition in the section 536 is that the judgment of the occurrence of a fault base on one judging value placed out of the normal range is continued by the fault judging section 535 for a first predetermined period of time. Therefore, the judging condition in the state return judging section 537 includes the rotational angle θ changed over the entire range which differs from the judging condition in the section 536. Accordingly, there is little probability that the judgment of the section 536 and the judgment of the section 537 are alternately made.

Moreover, when the two conditions are simultaneously satisfied in the section 537, the detecting device 12 judged to be in the tentative fault state returns to a normal state. Accordingly, there is little probability that the fault detection unit 50 unnecessarily detects the occurrence of a fault in the detecting device 12.

Furthermore, four judging values are considered for the judgment of the section 535 at step S11, the judgment of the section 536 at step 17, the judgment of the section 537 at step 32 and the judgment of the section 538 at step S25. Therefore, these judgments can be correctly made as compared with the case where each judgment is made based on only one judging value.

Still further, the fault detection unit 50 can control the detecting device 12 in response to the judgment to be the tentative fault state such that the detecting device 12 stops outputting the rotational angle θ and can control the detecting device 12 in response to the judgment to have returned to the normal state such that the detecting device 12 restarts outputting the rotational angle θ to adjust the rotation of the rotor of the motor 7 according to the rotational angle θ.

Still further, the fault detection unit 50 divides the entire range of the rotational angle θ into four angle regions Ri and judges the detecting device 12, judged to be in the tentative fault state, to have returned to the normal state on condition that the rotational angle θ is placed within each of the angle regions Ri while each of the judging values is always placed within the normal range. Accordingly, the unit 50 can reliably recognize that the rotational angle θ is changed over the entire range.

MODIFICATIONS

This embodiment should not be construed as limiting the present invention to the structure of this embodiment, and the structure of this invention may be combined with that based on the prior art.

For example, the judgment at each of steps S11 and S32 is made for the four judging values. However, the judgment may be made at each of steps S11 and S32 for at least one of the judging values. Further, one or more judging values judged at step S11 may differ from one or more judging values judged at step S32.

Further, the entire range of the rotational angle θ is divided every π/4 to examine whether the rotational angle θ is changed over the entire range. However, the entire range of the rotational angle θ may be divided every particular angle smaller or larger than π/4. Further, the entire range of the rotational angle θ may be irregularly divided.

What is claimed is:

1. A fault detection unit for detecting a fault occurred in a detecting device which detects a rotational angle of a rotor with respect to a stator from a sine-wave phase signal and a cosine-wave phase signal of which amplitudes are modulated in a sinusoidal wave shape so as to be changed in a cycle of the rotation of the rotor, the fault detection unit comprising:

a first section which produces a fault judging value from the sine-wave phase signal and/or the cosine-wave phase signal received from the detecting device;

a second section which judges based on the fault judging value placed out of a normal range that a fault has occurred in the detecting device;

a third section which judges the detecting device to be in a tentative fault state, in response to continuation of the judgment by the second section for a first predetermined period of time;

a fourth section which examines whether the rotational angle is changed over its entire range and judges the detecting device, judged by the third section to be in the tentative fault state, to have returned to a normal state, in response to the rotational angle changed over the entire range and the fault judging value always placed within the normal range during the change of the rotational angle over the entire range; and a fifth section which judges the detecting device to be in a determinate fault state in response to continuation of the judgment by the second section for a second predetermined period of time which is longer than the first predetermined period of time, and decides occurrence of a fault in the detecting device.

2. The fault detection unit according to claim 1, wherein the detecting device has a resolver which generates the sine-wave phase signal and the cosine-wave phase signal in response to an exciting signal such that a sinusoidal waveform indicating a change of the amplitude of the sine-wave phase signal is shifted by π/2 radians of the rotational angle from that of the cosine-wave phase signal, an extracting unit which extracts a sine-wave phase amplitude signal indicating an amplitude of the sine-wave phase signal changed in the sinusoidal wave shape from the sine-wave phase signal and extracts a cosine-wave phase amplitude signal indicating an amplitude of the cosine-wave phase signal changed in the sinusoidal wave shape from the cosine-wave phase signal, and a calculating unit which calculates the rotational angle from the sine-wave phase signal and the cosine-wave phase signal, and the fault judging value produced by the first section is selected from the group consisting of a sum of the sine-wave phase amplitude signal squared and the cosine-wave phase amplitude signal squared or a square root of the sum, an average value of the amplitude of the sine-wave phase signal, an average value of the amplitude of the cosine-wave phase signal, and a rate of a change of the rotational angle.

3. The fault detection unit according to claim 1, further comprising a control section which controls the detecting device, judged by the third section to be in the tentative state, to stops outputting the rotational angle and controls the detecting device judged by the fourth section to have returned to the normal state such that the detecting device restarts outputting the rotational angle to adjust the rotation of the rotor according to the rotational angle.

4. The fault detection unit according to claim 1, wherein the second section calculates the fault judging value every third predetermined period of time and increments a fault count value each time the fault judging value is placed out of the normal range, the judgment of the third section is made based on the fault count value higher than a first predetermined value, and the judgment of the fifth section is made based on the fault count value higher than a second predetermined value which is higher than the first predetermined value.

5. The fault detection unit according to claim 1, wherein the fourth section divides the entire range of the rotational angle into a plurality of angle regions, checks whether the rotational angle is placed within each of the angle regions, and checks whether the fault judging value is placed within the normal range each time the angle region of the rotational angle is changed, and the judgment of the fourth section is made based on the rotational angle placed in each of the angle regions and the fault judging value always placed within the normal range.

* * * * *